(12) United States Patent
Rammhofer et al.

(10) Patent No.: US 8,042,839 B2
(45) Date of Patent: Oct. 25, 2011

(54) JOINING ARRANGEMENT FOR CONNECTING A PIPE TO A SYSTEM

(75) Inventors: Thomas Rammhofer, Sasbach (DE); Urban Panther, Seelbach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1 day.

(21) Appl. No.: 11/784,058

(22) Filed: Apr. 5, 2007

(65) Prior Publication Data
US 2007/0241559 A1 Oct. 18, 2007

Related U.S. Application Data

(63) Continuation of application No. PCT/DE2005/001626, filed on Sep. 16, 2005.

(30) Foreign Application Priority Data

Oct. 7, 2004 (DE) .................. 10 2004 048 819

(51) Int. Cl.
*F16L 41/12* (2006.01)
(52) U.S. Cl. .................. 285/215; 285/347; 285/373
(58) Field of Classification Search .................. 285/347, 285/330, 293.1, 215, 216, 373, 419; 138/110; 174/152 G, 153 G
See application file for complete search history.

(56) References Cited

U.S. PATENT DOCUMENTS

| | | | | |
|---|---|---|---|---|
| 2,311,427 | A * | 2/1943 | Winkelmeyer | 16/108 |
| 3,164,054 | A * | 1/1965 | Biesecker | 24/662 |
| 4,084,844 | A * | 4/1978 | Abner | 285/373 |
| 4,216,930 | A * | 8/1980 | Rossler et al. | 248/56 |
| 4,443,031 | A * | 4/1984 | Borsh et al. | 285/419 |
| 4,452,097 | A * | 6/1984 | Sunkel | 74/502.4 |
| 4,473,369 | A * | 9/1984 | Lueders et al. | 604/244 |
| 4,499,924 | A * | 2/1985 | Garrett | 138/110 |
| 4,795,197 | A * | 1/1989 | Kaminski et al. | 285/12 |
| 5,015,013 | A * | 5/1991 | Nadin | 285/64 |
| 5,131,572 | A * | 7/1992 | Spengler | 222/545 |
| 5,219,188 | A * | 6/1993 | Abe et al. | 285/93 |
| 5,277,459 | A * | 1/1994 | Braun et al. | 285/419 |
| 5,452,494 | A * | 9/1995 | Wright | 16/2.2 |
| 6,010,134 | A * | 1/2000 | Katoh | 277/615 |
| 6,082,333 | A * | 7/2000 | Vattelana et al. | 123/456 |
| 6,102,448 | A | 8/2000 | Fixemer et al. | |
| 6,311,734 | B1 * | 11/2001 | Petrovic | 138/110 |
| 6,454,314 | B1 * | 9/2002 | Grosspietsch et al. | 285/319 |
| 6,631,715 | B2 * | 10/2003 | Kirn | 128/200.24 |
| 6,837,237 | B2 * | 1/2005 | Kirn | 128/200.24 |
| 2005/0225082 | A1 * | 10/2005 | Dalle et al. | 285/330 |
| 2007/0228731 | A1 * | 10/2007 | Elflein et al. | 285/347 |

FOREIGN PATENT DOCUMENTS

| | | |
|---|---|---|
| DE | 3143041 | 5/1983 |
| DE | 19648683 | 11/1997 |
| GB | 521336 | 5/1940 |
| WO | 9800663 | 1/1998 |

* cited by examiner

*Primary Examiner* — James Hewitt
(74) *Attorney, Agent, or Firm* — Simpson & Simpson, PLLC

(57) ABSTRACT

The invention relates to a joining arrangement for connecting a pipe to a system, especially a hydraulic clutch disengagement system. The joining arrangement comprises a joining member which can be fixed to a final section of the pipe and is to be connected to an opposite piece that is fastened to the system. The joining member positively embraces at least one radially prominent protrusion of the pipe for fastening purposes.

8 Claims, 2 Drawing Sheets

JOINING ARRANGEMENT FOR CONNECTING A PIPE TO A SYSTEM

CROSS-REFERENCE TO RELATED APPLICATIONS

This application is filed under 35 U.S.C. §120 and §365(c) as a continuation of International Patent Application PCT/DE2005/001626, filed Sep. 16, 2005 and published Apr. 20, 2006, which application is incorporated herein by reference. This application also claims priority from German Patent Application No. 10 2004 048 819.3, filed Oct. 7, 2004, which application is incorporated herein by reference.

FIELD OF THE INVENTION

The present invention relates to a joining arrangement for connecting a pipe to a system, in particular to a hydraulic clutch disengagement system, having a joining member that can be attached to an opposing piece attached to the system, said joining member being attachable to an end section of the pipe.

BACKGROUND OF THE INVENTION

Such joining arrangements are known from the state of the art. For example, these joining arrangements are used for hydraulic plug connections on coupling pressure lines, where screw connections having a fitting, for example, are provided as the joining members, which can then be screwed tightly onto a pipe made of metal, for example. It is also known that such connecting members can be attached to the pipe fixedly, i.e., not detachably, by soldering or the like.

The document DE 196 48 683 A1, for example, discloses a hydraulic cylinder having a venting element. The hydraulic cylinder which is used as a slave cylinder or master cylinder in a hydraulic disengagement system may have an opposing piece to which a joining member of a known joining arrangement is attached to connect the pipe to the hydraulic cylinder of the hydraulic clutch disengagement system.

The document DE 197 40 649 B4 discloses a plug connection for connecting pipes and hose lines. The known plug connection comprises an inner sleeve and an outer sleeve. A pipe or hose line is accommodated between the inner sleeve and the outer sleeve, whereby a pipe connection that is pushed over the outer sleeve is also provided. In the case of the connecting member and/or joining member, which is designed in multiple parts, it is possible with another component to achieve a catch engagement of the pipe connection with the outer sleeve. With the known joining arrangement, the resulting production is cost-intensive due to the multitude of components.

Another joining arrangement is known from the document DE 31 43 041, which discloses a device for detachable fastening of a hydraulic line to a hydraulic connection. The hydraulic connection, which is screwed into a housing that carries hydraulic medium, is connected to the hydraulic line via a coupling part. To attach the coupling part to the hydraulic medium connection, the coupling part must be pushed onto the hydraulic line. Then additional operations on the hydraulic line using special tools are required to reshape the end of the line so that the coupling part is connected to the hydraulic line. Finally, the coupling part is connected to the hydraulic connection by a catch engagement.

In particular when using the joining arrangement for connecting a coupling line to a hydraulic disengagement system, the connection arrangement has a significant influence on the manufacturing costs. Therefore it is necessary to construct the joining arrangement with the simplest possible design so that manufacturing costs can be lowered.

SUMMARY OF THE INVENTION

Accordingly, the object of the present invention is to propose a connecting device of the generic type defined in the introduction that can be constructed as easily as possible and is also inexpensive to manufacture.

This object is achieved according to this invention by the fact that the joining arrangement for connecting a pipe to a system, in particular to a hydraulic clutch disengagement system, has at least one connecting member to be connected to an opposing piece that is attached to the system, said connecting member being attachable to an end section of the pipe, whereby according to this invention the connecting member surrounds at least one radial protrusion on the pipe in a form-fitting manner for the purpose of fastening.

In this way, an especially inexpensive and simple design for joining two hydraulic components or the like can be implemented. This can be achieved, for example, by using the smallest possible number of required components, and furthermore, in contrast with the known joining arrangements, no unusual assembly steps are required.

Within the framework of a possible embodiment of the present invention, it is possible to provide for with the inventive joining arrangement, the connecting member to preferably surround a first housing half and a second housing half, which can be joined together by the pipe. The pipe is thus completely surrounded by the two housing halves, which are in direct contact, at least in the area of the radial protrusion, so that the connecting member is securely attached to the pipe. By surrounding the protrusion, support of any axial forces that occur and act on the connecting member is made possible in particular. It is also possible that any other allocation of the connecting member is possible, but dividing the connecting member into two housing halves for the purpose of manufacturing is especially favorable.

To position and attach the two housing halves accurately against one another without any great effort, according to a refinement of the embodiment described above, it is possible to provide for the housing halves to have centering means and at least one fastening element.

For example, at least one centering pin with a corresponding receptacle or the like may be provided as the centering means. To do so, the centering pin is provided on the one housing half and the corresponding receptacle is provided on the other housing half so that housing halves having a more or less complementary design are used. Two centering pins that are approximately in diametric opposition are preferably used so that a correct alignment of the two housing halves in fastening is ensured.

Preferably a catch connection or the like may be used on the two housing halves as the fastening element. To do so, a catch projection, for example, may be provided on each housing half, so that it can be engaged in a respective catch receptacle when the housing halves are joined together. Other fastenings, preferably releasable, are also conceivable for shipping security.

Another implementation of the embodiment of the present invention described here may also provide for the two housing halves to be designed so that they are complementary and in mirror symmetry. However, it is also conceivable for the housing halves to be designed so that they are not symmetrical with one another in that there may be any division into housing parts of different sizes. However, from a technical manufacturing standpoint, a symmetrical division of the housing halves has proven to be advantageous.

In this embodiment of the inventive joining arrangement, the housing halves that are in contact with one another may have a peripheral groove, preferably on their inside surface facing the pipe, so that the groove accommodates the protrusion on the pipe that extends radially. The cross-sectional shape of the groove is adapted to the shape of the radial protrusion provided on the pipe so that the protrusion is accommodated in the groove in a form-fitting manner. This provides axial security for the connecting member on the pipe. A design of the protrusion approximately in the form of a stuffed seam on the pipe has proven especially advantageous. This stuffed seam may be provided, e.g., by an upset forging treatment of the pipe in the area of the protrusion. However, other forms of the protrusion are also conceivable.

According to a next refinement, it is possible for another radial protrusion to be provided on the pipe, in particular at the end of the pipe, which is to be connected to the opposing piece. The radial protrusion may be formed, for example, by a corresponding widening of the end of the pipe.

A sealing element may preferably be provided between the additional protrusion and the end of the connecting member facing the protrusion. With the sealing element, which is designed as an O-ring or the like, a seal can thus be ensured in both the direction of flow and the system direction. Therefore, no additional seals are required.

Another possible embodiment of the present invention may provide for the connecting member to be designed as a one-piece housing, for example, which can be widened in the radial direction. Due to the possibility of widening the housing, the connecting member may be passed over the radial protrusion provided on the pipe until the protrusion is surrounded by the corresponding receptacle in the interior of the housing. Again in this embodiment of the present invention, it is possible to ensure a secure axial passing of the connecting member.

In this embodiment, a refinement of the present invention may provide for the housing to have at least one slot or the like with a predetermined length running in the axial direction. The slot may allow radial widening of the connecting member, which is required in assembly, so that the connecting member can be shifted over the protrusion in assembly.

Again in this embodiment, the housing may also have a peripheral groove on the inside surface facing the pipe which is arranged in such a way that the radially aligned protrusion of the pipe can be accommodated there. With the embodiment described here, the protrusion in the form of a stuffed seam is preferably formed by upset forging of the pipe, which is accommodated in the suitably designed groove. Here again, other cross-sectional shapes of the groove and/or the protrusion are also conceivable.

To ensure an optimal seal in the direction of flow on the one hand and in the system direction on the other hand in this embodiment, the end of the housing facing the end section of the pipe may be designed as a sealing element. In this way, the need for another separate component, namely an additional sealing element is eliminated in this embodiment because the seal is provided directly on the housing with the joining arrangement according to this invention.

A possible embodiment of the invention may provide for the sealing element to be integrally molded onto the housing. However, other embodiments are also conceivable for implementing the seal. For example, it is also possible for a separate sealing element to be used with this embodiment. The separate sealing element may possibly also be used in addition.

Within the framework of the present invention, a plastic may be used as the material for the connecting member in the two exemplary embodiments. Other materials may also be used, but it has been found that it is especially inexpensive to use plastic as the material. Furthermore, the tool and die costs are also reduced. Furthermore, this yields the advantage that the corrosion problems, which would otherwise occur, are avoided with the inventive arrangement made of plastic.

With the inventive joining arrangement, the outer contour of the connecting member may be adapted accordingly to the receiving area of the corresponding opposing piece, which is attached to the clutch disengagement system, for example, and receives the connecting member. The respective contour is necessary to allow a connection between the connecting member and the opposing piece to a disengagement system, for example. With regard to the design embodiment of the contour, there are no restrictions in use of the inventive joining arrangement. This is also true of the type of pipe used because the inventive connecting member may be used for steel-rubber pipes as well as plastic pipes.

BRIEF DESCRIPTION OF THE DRAWINGS

The present invention is explained in greater detail below with reference to the drawings, in which.

DETAILED DESCRIPTION OF THE INVENTION

Figure 1:
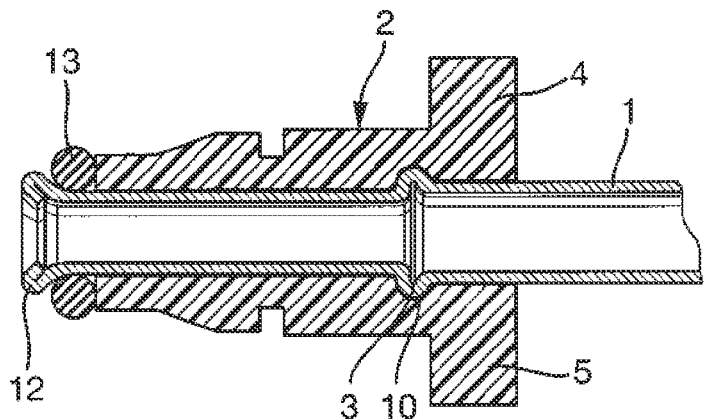
FIG. 1 shows a sectional view through a first possible embodiment of an inventive joining arrangement.
Figure 2:
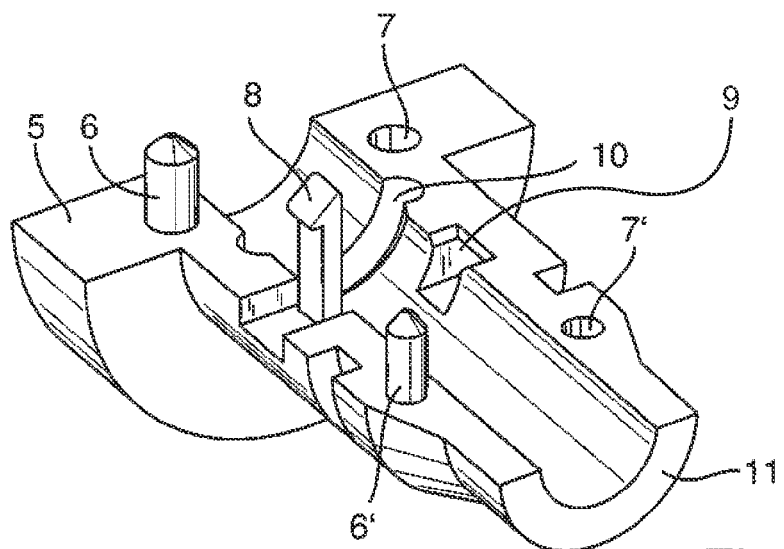
FIG. 2 shows a three-dimensional schematic view of a housing half according to the first embodiment of the inventive joining arrangement.
Figure 3:
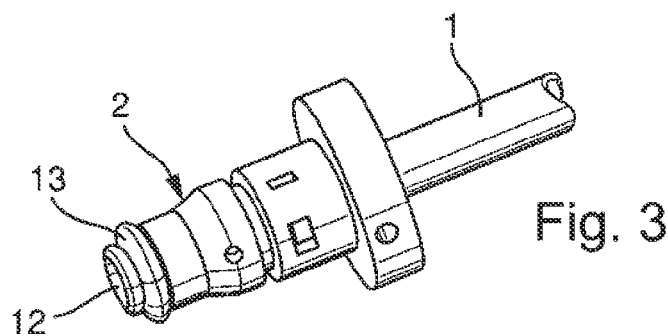
FIG. 3 shows a three-dimensional schematic view of a connecting member provided on a pipe according to the first embodiment of the invention.
Figure 4:
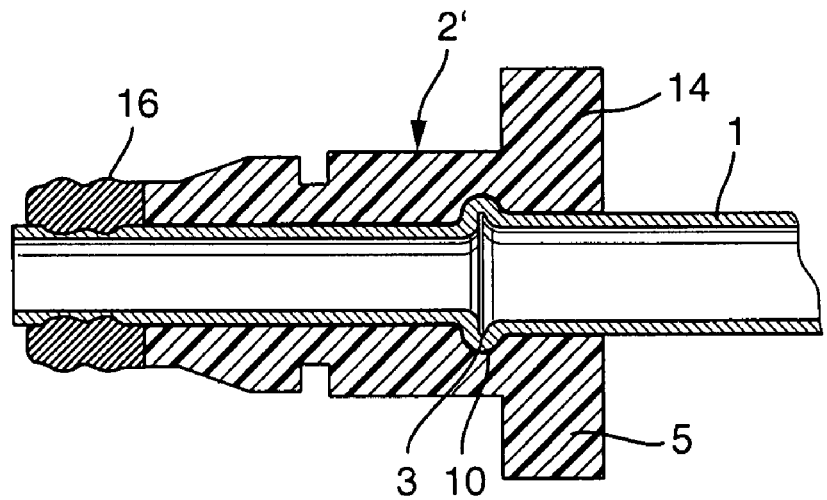
FIG. 4 shows a sectional view of a second embodiment of the inventive joining arrangement; and, FIG. 5 shows a three-dimensional schematic view of a connecting member provided on a pipe according to the second embodiment of the present invention.
Figure 5:
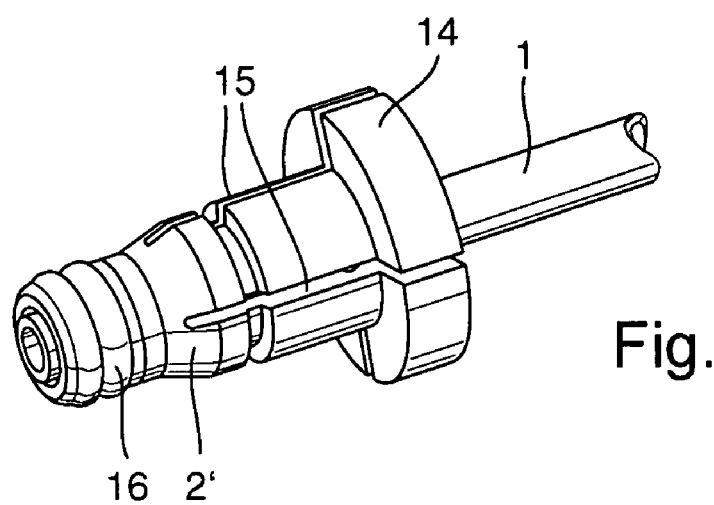

FIGS. 1 through 3 show a first possible embodiment of an inventive joining arrangement for connecting pipe 1 to a system (not shown here), in particular to a hydraulic clutch disengagement system. However, FIGS. 4 and 5 show a second embodiment as an example.

In both embodiments, the inventive joining arrangement has connecting member 2 which can be connected to a corresponding opposing piece (not shown further here). Connecting member 2 can be attached to an end section of the pipe 1. Pipe 1 has radially prominent protrusion 3, which is formed by a corresponding upset forging of pipe 1 as a stuffed seam.

In the first embodiment connecting member 2 comprises first housing half 4 and second housing half 5 which are joined together on pipe 1. As FIG. 3 shows, centering means and a fastening element are provided on each housing half 4, 5. Two centering pins 6, 6' are provided on each housing half 4, 5 as centering means with corresponding receptacles 7, 7' on the respective other housing half 4, 5. A catch connection is provided as the fastening element. To this end, each housing half 4, 5 has catch part 8 and corresponding catch receptacle 9 provided on the other housing half 4, 5 for the respective catch part 8. FIG. 2 shows only housing half 5, whereby two housing halves 4, 5 are designed to be complementary to one another.

When two housing halves 4, 5 are joined to one another, as depicted in FIG. 3, two housing halves 4, 5 surround radial protrusion 3 provided on pipe 1 in a form-fitting manner. This achieves an axial fixation of connecting member 2 on pipe 1. Peripheral groove 10 in the interior of two abutting housing halves 4, 5 is provided as the receiving area for radial protrusion 3 on the pipe, said groove accommodating radially prominent protrusion 3 in a form-fitting manner. On end 11 facing the end section of the pipe and/or on the end face of connecting member 2 another second radial protrusion 12 is provided on pipe 1. A sealing element designed as an O-ring 13 is provided between second protrusion 12 and end 11 of connecting member 2 facing protrusion 12. Additional protrusion 12 serves as a lock-proof device for O-ring 13.

FIGS. 4 and 5 show another embodiment of the inventive joining arrangement.

In this embodiment, connecting member 2' is designed as one-piece housing 14 which also surrounds protrusion 3 on pipe 1 in a form-fitting manner. To shift connecting member 2' axially over radially prominent protrusion 3, housing 14 can be widened in the radial direction. This is implemented by slots 15 having a predetermined length running in the axial direction, as shown in FIG. 5. In the embodiment shown here, four slots 15 are distributed uniformly around the circumference.

The axial fastening of connecting member 2' and/or housing 14 is also achieved by the form-fitting connection between radial protrusion 3 on pipe 1 and groove 10 in the inner area of housing 14.

Another difference in comparison with the first embodiment of the inventive joining arrangement is obtained due to the fact that end area 16 of housing 14 facing the end section of the pipe is designed as a sealing element. The end area and/or sealing element 16 is integrally molded on housing 14.

Preferably, plastic may be used as the material for connecting member 2, 2' for both embodiments depicted here. The outer contour of the respective connecting members 2, 2' is adapted to the respective contour of the corresponding opposing pieces.

LIST OF REFERENCE NUMERALS

| | |
|---|---|
| 1 | pipe |
| 2, 2 | connecting member |
| 3 | protrusion |
| 4 | first housing half |
| 5 | second housing half |
| 6, 6' | centering pin |
| 7, 7' | receptacle |
| 8 | catch part |
| 9 | catch receptacle |
| 10 | groove |
| 11 | end face |
| 12 | second protrusion |
| 13 | O-ring |
| 14 | Housing |
| 15 | Slot |
| 16 | end area of the housing |

We claim:

1. A connecting member for connecting a pipe (1) to a system, comprising:
   a first housing half (4);
   a second housing half (5) attachable to the first housing half;
   a first opening at a first end, the first opening having a first diameter;
   a second opening at a second end, opposite the first end, having a second diameter;
   a first bore extending from the first end toward the second end and having a first uniform diameter equal to the first diameter;
   a second bore extending from the second end toward the first end and having a second uniform diameter equal to the second diameter;
   a groove in contact with the first and second bores and having a third diameter greater than the first or second diameters;
   centering mechanism for the first and second halves;
   a sealing ring abutting the first end of the connecting member and having substantially the same internal diameter as the first diameter; and,
   at least one fastening element, with a catch connection, arranged to fix the first half to the second half, wherein the catch connection includes a barbed protrusion on the first housing half for lockingly engaging with an indentation in the second housing half, wherein an outer contour of the connecting member is adapted to a contour of a receiving area of a corresponding opposing piece accommodating the connecting member, and wherein the first and second halves are adapted for connection to the corresponding opposing piece in the system and are adapted to surround a first radially prominent protrusion (3) on an end section of the pipe in a form-fitting manner.

2. The connecting member as recited in claim 1, wherein the centering mechanism comprises at least one centering pin (6, 6') and a corresponding receptacle (7, 7') on each of the housing halves.

3. The connecting member as recited in claim 1, wherein the first and second housing halves (4, 5) are designed to be complementary to one another.

4. The connecting member as recited in claim 1, wherein the groove is adapted for facing the pipe (1), and said groove is adapted to accommodate the first radially prominent protrusion (3) on the pipe (1).

5. The connecting member as recited in claim 1, wherein at least one second radially prominent protrusion (12) is provided on the end section of the pipe (1) that is to be connected.

6. The connecting member as recited in claim 5, wherein the sealing ring is adapted to engage the second protrusion (12).

7. The connecting member as recited in claim 6, wherein the sealing ring is an O-ring (13).

8. The connecting member as recited in claim 1, wherein the connecting member (2, 2') is made of plastic.

* * * * *